April 11, 1961  P. F. WARNER  2,979,509
TREATMENT OF POLYMERS PRODUCED BY ALKALI
METAL CATALYZED POLYMERIZATION
Filed May 6, 1957
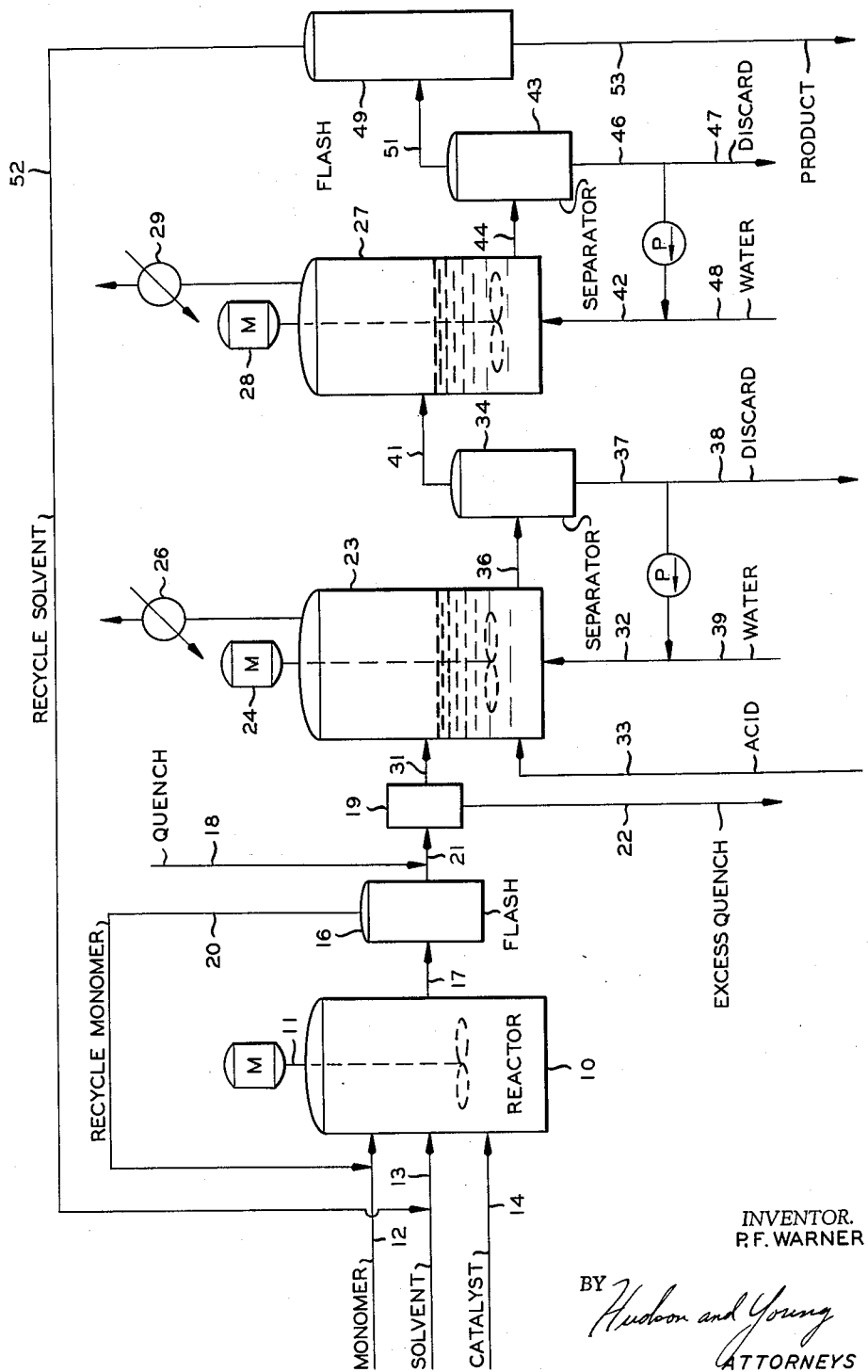
INVENTOR.
P. F. WARNER
BY Hudson and Young
ATTORNEYS

United States Patent Office 2,979,509
Patented Apr. 11, 1961

2,979,509

TREATMENT OF POLYMERS PRODUCED BY ALKALI METAL CATALYZED POLYMERIZATION

Paul F. Warner, Phillips, Tex., assignor to Phillips Petroleum Company, a corporation of Delaware Filed May 6, 1957, Ser. No. 657,403

10 Claims. (Cl. 260—290)

This invention relates to treatment of polymers produced by alkali metal catalyzed polymerization.

The polymerization of dienes, such as 1,3-butadiene, in the presence of alkali metals, such as sodium, potassium or lithium, in the presence or absence of a solvent, is well known. Solid or liquid polymers may be produced using these catalysts; liquid polymers are readily formed by operating at relatively high temperatures with a suitable solvent, such as benzene, heptane, or the like to obtain a solution of liquid polymer in the solvent.

In the alkali metal polymerization of conjugated dienes and the like, it is necessary to treat the resulting reaction mixture in some manner to convert the alkali metal and reactive alkali metal organic compounds present to prevent further catalytic effect of the alkali metal on the product. Alkali metal catalysts are harmful if left in the product because they promote crosslinking of the polymer with concomitant formation of gel. Alkali metal hydroxides left in the polymers are deleterious for many uses of such polymers. For instance, a low molecular weight polymer, which is to be incorporated in synthetic rubber to improve its processing characteristics, will impart too fast a curing rate if it contains alkali metal hydroxides. A liquid polymer which is to be used as a drying oil should not contain any substantial amount of alkali metal or alkali metal compounds as these tend to render the liquid cloudy and cause undesirable reactions when compounding these oils in paints, various types of varnishes, and protective surface coatings and adhesive formulations.

Washing such products with alcohol, water or dilute aqueous acids has been used but a difficulty has been the formation of emulsions which are difficult to break. I have made an extended study of washing techniques and have discovered a process by which products of extremely low ash content can be made. This work has shown that the ratio of the water to organic phase must be above a certain amount and that elevated temperatures are required. Using this method, a washing procedure comprising a dilute acid wash and a water wash are used and vigorous agitation can be employed for good contacting without the formation of emulsions which are difficult to break.

The following are objects of my invention.

An object of this invention is to provide a method of treatment of polymers produced by alkali metal catalyzed polymerization. A further object of my invention is to provide polymers of dienes containing low ash content. A further object of my invention is to provide a washing procedure for liquid diene polymers wherein emulsions difficult to separate are not found.

Other objects and advantages of the present invention will become apparent to one skilled in the art upon reading this specification which includes A drawing which shows in diagrammatic form apparatus suitable for practicing my invention.

The invention is particularly applicable to the treatment of liquid diene polymers prepared in accordance with the process disclosed in Crouch 2,631,175. It is applicable to polymers of conjugated dienes such as 1,3-butadiene, isoprene, 2,3-dimethyl-1,3-butadiene, chloroprene, and the like, alone or in admixture with each other and/or with other monomers copolymerizable therewith such as styrene, vinylpyridine, 2-methyl-5-vinylpyridine, methylstyrene, vinyl naphthalene, and the like. Generally, the conjugated diene is the monomer used in greater amount. The liquid polymers generally have viscosities ranging from 100 to 6000 Saybolt Furol seconds at 100° F. although polymers of much higher viscosity can be treated according to my invention.

I have discovered that the polymeric product can be obtained in a form containing very low ash content if it is washed in a two-stage process following treatment of the polymer to destroy the catalyst therein. The volume of water used in the washing step should be at least three times, and preferably five times, the amount of the organic phase in each stage. The first washing stage contains a small amount of an acid, aqueous mineral and fatty acids being applicable. Suitable acids include acetic acid, sulfuric acid, hydrochloric acid, hydrofluoric acid, nitric acid, carbonic acid, and the like. Generally, about 0.5 volume percent acid should be used in the first washing operation. This acid should be sufficient to maintain the treating solution acid to phenolphthalein. Furthermore, elevated temperatures should be used, a range from 90° F. to the temperature at which the mixture boils being suitable. Even stable emulsions can be easily broken by heating the emulsion for a short time at gentle reflux at atmospheric pressure, this being the range from about 180° F. to 190° F. for an emulsion of water and a solution of liquid polybutadiene in commercial grade normal heptane. Using the high ratio of water to oil, water in oil emulsions are not formed even though vigorous agitation is used. Other polymer solvents which can be used include pentane, hexane, cyclohexane, benzene, toluene, xylene, and the like.

Directing attention to the drawing, the process can be easily understood. As stated, the polymerization process is essentially that of the cited Crouch patent. The polymerization is conducted in a reactor 10 provided with agitation means 11. The monomer is supplied to the reactor by means of conduit 12 and the solvent is supplied by conduit 13. The finely divided catalyst is usually charged to the reactor as a dispersion thereof in a hydrocarbon by means of conduit 14. Polymerization is usually carried out at an elevated temperature. The monomer can be continuously added, suitable temperature control being maintained by heating or cooling as necessary. The effluent from the reactor which comprises a solution of the polymer in the solvent, unreacted monomer, and catalyst, is passed to flash zone 16 by means of conduit 17. Unreacted monomer is flashed off and returned to the polymerization zone by means of conduit 20. The resulting solution is then treated to produce the ash free product by means of my invention. Following removal of the monomer, the quench liquid, such as a low molecular weight alcohol, is added to the reactor effluent by means of conduit 18 as this effluent is passed from flash zone 16 to separation zone 19 by means of conduit 21. Suitable alcohols include those containing up to four carbon atoms per molecule, such as methanol, ethanol, 1-propanol, 2-propanol, 1-butanol, 2-butanol, 2-methyl-1-propanol, 2-methyl-2-propanol, propylene glycol, and butylene glycol. The addition of such an alcohol deactivates any free catalyst present in the effluent. Excess alcohol is removed from zone 19 by means of conduit 22 and the product is then subjected to the two-stage washing operation of the present invention.

For this operation, wash zones 23 and 27 are provided, these being provided with agitation means 24 and 28, respectively, and reflux condensers 26 and 29, respectively. From zone 19, the polymer solution is passed to treating zone 23 by means of conduit 31, water being added thereto by means of conduit 32 and acid supplied through conduit 33. The amount of water should be such that the water to organic material ratio is at least three and preferably at least five, the amount of acid should be sufficient to make the water phase acid to phenolphthalein. When carbonic acid is used, it can be supplied by adding gaseous carbon dioxide to the treating zone. The residence time for this washing should be in the range of approximately one-half to three hours. After suitable washing, a portion of the liquid in zone 23 is passed to phase separator 34 by means of conduit 36. In a short time, the phase separation takes place and the water, being heavier, is removed from the bottom of separator 34 by means of conduit 37 which can be recycled by means of conduit 32 to zone 33. A portion of this water can be discarded as desired, by means of conduit 38 and make-up water can be supplied by means of conduit 39.

The hydrocarbon phase is passed from separator 34 to wash zone 27 by means of conduit 41. Water is supplied to this zone by means of conduit 42. The amount of water should be such that a water to organic phase ratio of three, preferably at least five, is maintained. After an approximate treating time of one-half to three hours, a portion of the contents of zone 27 are passed to separator 43 by means of conduit 44. This separator provides a phase separation in the manner of separator 34 and the water is removed from the bottom of separator 43 by means of conduit 46, and a portion thereof can be returned to the wash zone 27 by means of conduit 42. Discard conduit 47 is likewise provided and make-up water is supplied by conduit 48. The effluent from phase separator 43 is passed to flash zone 49 by means of conduit 51. In this flash zone 49, the solvent is flashed off the polymer and recycled to reactor 10 by means of conduit 52. The product, the free polymer or a solution thereof in the desired amount of solvent, is obtained in conduit 53.

Obviously, my process can be operated batchwise or, by suitable flow control means, or can be operated as a continuous process. When continuous operation is used, a small amount of the material in each wash zone is continuously passed to the separator. The organic and aqueous phases, after separating, each pass their separate ways. The size of the various components is not critical but it is important that means to provide vigorous agitation are necessary in zones 23 and 27 and heating is necessary for these zones. The use of the large amounts of aqueous treating solutions and the elevated temperatures make possible polymer washing without the necessity of using emulsion breaking materials and therefore provide products of great purity.

The following examples set forth specific embodiments of the process disclosed herein.

Example I

A series of liquid polymers prepared by sodium catalyzed polymerization were made and treated according to the process of my invention. These were made using n-heptane as the solvent or diluent. The data for these runs are set forth in the following table. All runs were made at a polymerization temperature of 200° F. except for run 9 which was prepared at a polymerization temperature of 220° F. The residence time was 1.2 hours in each case and a butadiene/heptane ratio of 35/65 was used in all runs except runs 10, 11, and 12 wherein the ratio was 15/85. A stirrer speed of 1500 r.p.m. in each water washing step provided vigorous agitation. The results are as follows:

| Run No. | Sodium Concentration,[2] Wt. Percent | Pressure, p.s.i.g. | Product Viscosity, SFS at 100° F. | Water Phase,[3] ml. | Organic Phase,[3] ml. | Wash Temp.,[3] °F. | Residence Time,[3] hr. | Ash, Wt. Percent |
|---|---|---|---|---|---|---|---|---|
| 1 | 1.75 | 50 | 545 | 3,800 | 800 | 185 | 1.6 | 0.000 |
| 2 | 1.75 | 35 | 3,963 | 3,200 | 1,000 | 185 | 1 | 0.000 |
| 3 | 1.75 | 65 | 575 | 3,200 | 1,000 | 185 | 1 | 0.000 |
| 4 | 1.75 | 65 | 575 | 3,000 | 1,000 | 185 | 1 | 0.006 |
| 5 | 1.75 | 25 | 651 | 3,200 | 1,000 | 185 | 0.8 | 0.000 |
| 6 | 1.75 | 35 | 683 | 3,200 | 1,000 | 185 | 0.8 | 0.000 |
| 7 | 2.25 | 35 | 544 | 3,300 | 1,000 | 185 | 0.67 | 0.000 |
| 8 | 0.75 | 35 | 870 | 3,400 | 1,000 | 185 | 0.91 | 0.001 |
| 9 | 1.75 | 35 | 3,170 | 3,400 | 1,000 | 185 | 0.91 | 0.003 |
| 10 | 1.75 | 35 | 1,827 | 3,400 | 500 | 100 | 0.67 | 0.000 |
| 11 | 1.75 | 35 | 1,827 | 3,500 | 700 | 128 | 0.93 | 0.001 |
| 12 | 1.75 | 35 | 1,827 | 3,500 | 700 | 150 | 0.93 | 0.000 |
| 13 [1] | | | | 3,500 | 700 | 94 | 0.93 | 0.000 |
| 14 [1] | | | | 3,500 | 750 | 94 | 0.75 | 0.007 |
| 15 [1] | | | | 3,500 | 750 | 75 | 0.50 | 0.013 |

[1] Runs 13, 14, and 15 were a mixutre of equal parts of runs 7, 8, and 9.
[2] Based on 1,3-butadiene.
[3] In each stage.

Run 15 illustrates the necessity of the elevated temperature in the work, this product having a greatly increased ash content when compared to the other runs. It will also be noted that better results were obtained at the temperature of reflux. At the lower temperatures (90° F. and slightly above), there is a tendency toward retention of increasing amounts of water in the oil phase. However, there was no difficulty encountered in liquid phase separation. It is apparent that the process of this invention can be consistently used to produce products having below 0.01 and preferably 0.001 weight percent ash. Such low ash contents are especially desirable when high dielectric strengths are desired.

Example II

Copolymers of 1,3-butadiene and 2-methyl-5-vinylpyridine were made using varying amounts of 2-methyl-5-vinylpyridine. In the first run, 2.5 weight percent based on the butadiene was used. This material was polymerized at a temperature of 185° F. and a pressure of 30 p.s.i.g. using finely divided sodium as the catalyst in an amount of one weight percent based on the butadiene. The product has a viscosity of 3841 Saybolt Furol seconds at 100° F. Commercial grade normal heptane was used as the solvent. Following polymerization, the products were contacted with methanol and subsequently washed in the two-stage process of the present invention. Both wash vessels were maintained at 140° F. to 150° F. and carbonic acid was used by bubbling carbon dioxide into the water phase of the washer. In some runs, 0.5 volume percent sulfuric acid was also used in the first washer. The product after this treatment had an ash content of 0.005 weight percent.

In another run, five weight percent based on the butadiene of 2-methyl-5-vinylpyridine was used to prepare a copolymer. The polymer was produced in commercial grade normal heptane using one weight percent finely divided sodium as the polymer catalyst and a reaction temperature of 195° F. at a pressure of 35 p.s.i.g. The product was washed as above and had a viscosity of 2170 Saybolt Furol seconds at 100° F. and an ash content of 0.002 weight percent.

*Example III*

A liquid copolymer prepared by using a monomer ratio of 85 parts 1,3-butadiene and 15 parts styrene when treated according to this two-stage washing process produces a product having an ash content of below 0.01 weight percent.

As many possible embodiments can be made of this invention without departing from the scope thereof, it is to be understood that all matter herein set forth or shown in the accompanying drawing is to be interpreted as illustrative and not as unduly limiting the invention.

I claim:

1. In the separation of alkali metal impurities from a polymer of a conjugated diene prepared by alkali metal catalyzed polymerization, a process comprising washing a solution of said polymer in the polymerization solvent with vigorous agitation with water to which acid has been added, the amount of water being sufficient to provide a water to organic ratio of at least 3, at atmospheric pressure and a temperature in the range of 90° F. to the temperature at which the mixture boils; removing a portion of the mixed aqueous/organic phase; separating said phases; passing the organic phase to a second aqueous washing step wherein the amount of water is sufficient to provide a water to organic ratio of at least 3 at atmospheric pressure and a temperature in the range of 90° F. to the boiling point of the mixture; removing a portion of the mixed aqueous/organic phase from the second washing operation; separating said phases; passing the organic phase to a separation zone; and recovering the purified polymer.

2. The process of claim 1 wherein the polymer is a homopolymer of a conjugated diene.

3. The process of claim 1 wherein the polymer is a homopolymer of 1,3-butadiene.

4. The process of claim 1 wherein the polymer is a copolymer of 1,3-butadiene and sytrene.

5. The process of claim 1 wherein the polymer is a copolymer of 1,3-butadiene and 2-methyl-5-vinylpyridine.

6. In the separation of alkali metal impurities from a polymer of a conjugated diene prepared by alkali metal catalyzed polymerization, a process comprising washing a solution of said polymer in the polymerization solvent with vigorous agitation with water to which acid has been added, the amount of said water being sufficient to provide a water to organic ratio of at least 3, at atmospheric pressure and a temperature in the range of 90° F. to the temperature at which the mixture boils; removing a portion of the mixed aqueous/organic phase; separating said phases; returning at least a portion of the aqueous phase to said washing step; passing the organic phase to a second aqueous washing step wherein the amount of water is sufficient to provide a water to organic ratio of at least 3 at atmospheric pressure and a temperature in the range of 90° F. to the boiling point of the mixture; removing a portion of the mixed aqueous/organic phase from the second washing operation; separating said phases; returning at least a portion of the aqueous phase to the second washing step; passing the organic phase to a separation zone; and recovering the purified polymer.

7. In the separation of alkali metal impurities from liquid polybutadiene prepared by alkali metal polymerization, the continuous process comprising washing a solution of said polymer in the polymerization solvent with vigorous agitation with water to which acid has been added, the amount of said water being sufficient to provide a water to organic ratio of at least 3, at a temperature in the range of 180 to 190° F.; removing a portion of the mixed aqueous/organic mixture; separating said phases; returning at least a portion of the aqueous phase to said washing step; passing the organic phase to a second aqueous washing step wherein the amount of water is sufficient to provide a water to organic ratio of at least 3 at a temperature in the range of 180 to 190° F.; removing a portion of the mixed aqueous/organic phase from the second washing operation; separating said phases; returning at least a portion of the aqueous phase to the second washing step; passing the organic phase to a separation zone; and recovering the purified polymer.

8. In the separation of alkali metal impurities from a liquid polymer prepared by alkali metal polymerization of a mixture of 1,3-butadiene and 2-methyl-5-vinylpyridine, the continuous process comprising washing with vigorous agitation a solution of said polymer in the polymerization solvent with aqueous carbonic acid, said carbonic acid being formed by introducing carbon dioxide into the mixture being washed, the amount of water being sufficient to provide a water to organic ratio of at least 3, at a temperature in the range of 140 to 150° F.; removing a portion of the mixed aqueous/organic mixture; separating said phases; passing the organic phase to a second aqueous acid washing step, the acidity of said solution being maintained by bubbling carbon dioxide therethrough, the amount of water being sufficient to provide a water to organic ratio of at least 3, at a temperature in the range of 140 to 150° F.; removing a portion of the mixed aqueous/organic phase from the second washing operation; separating said phases; passing the organic phase to a separation zone; and recovering the purified polymer.

9. The process of claim 1 wherein the water to organic ratio in each washing operation is at least 5.

10. The process of claim 8 wherein the water to organic ratio in each washing operation is at least 5.

References Cited in the file of this patent

UNITED STATES PATENTS

| | | |
|---|---|---|
| 2,264,811 | Rothrock | Dec. 2, 1941 |
| 2,631,175 | Crouch | Mar. 10, 1953 |
| 2,712,561 | Gleason | July 5, 1955 |
| 2,714,620 | Leary | Aug. 2, 1955 |
| 2,751,375 | Mantell et al. | June 19, 1956 |